(12) United States Patent
Weber

(10) Patent No.: US 11,691,472 B2
(45) Date of Patent: Jul. 4, 2023

(54) BEARING DEVICE FOR MOUNTING AN AXLE GUIDE

(71) Applicant: SAF-HOLLAND GmbH, Bessenbach (DE)

(72) Inventor: Elmar Weber, Dülmen (DE)

(73) Assignee: SAF-HOLLAND GmbH, Bessenbach (DE)

(*) Notice: Subject to any disclaimer, the term of this patent is extended or adjusted under 35 U.S.C. 154(b) by 225 days.

(21) Appl. No.: 17/264,189

(22) PCT Filed: Jul. 29, 2019

(86) PCT No.: PCT/EP2019/070366
§ 371 (c)(1),
(2) Date: Jan. 28, 2021

(87) PCT Pub. No.: WO2020/025542
PCT Pub. Date: Feb. 6, 2020

(65) Prior Publication Data
US 2022/0118808 A1 Apr. 21, 2022

(30) Foreign Application Priority Data

Jul. 30, 2018 (DE) ..................... 10 2018 118 340.2

(51) Int. Cl.
*B60G 7/02* (2006.01)
(52) U.S. Cl.
CPC .......... *B60G 7/02* (2013.01); *B60G 2202/152* (2013.01); *B60G 2204/143* (2013.01);
(Continued)

(58) Field of Classification Search
CPC .... B60G 7/02; B60G 2202/152; B60G 15/02; B60G 15/04; B60G 2204/4302
See application file for complete search history.

(56) References Cited

U.S. PATENT DOCUMENTS

| | | | |
|---|---|---|---|
| 6,430,774 B1 | 8/2002 | McLaughlin et al. | |
| 8,973,931 B2 * | 3/2015 | Branger | B60G 7/005 280/124.13 |

(Continued)

FOREIGN PATENT DOCUMENTS

| | | |
|---|---|---|
| CN | 201275995 Y | 7/2009 |
| CN | 107327478 A | 11/2017 |

(Continued)

OTHER PUBLICATIONS

European Patent Office, International Search Report, dated Nov. 6, 2019.

*Primary Examiner* — Faye M Fleming
(74) *Attorney, Agent, or Firm* — Price Heneveld LLP

(57) ABSTRACT

A bearing device for mounting an axle guide for commercial vehicles includes a first connector which has an axial direction of extension, and a first axial centre in the axial direction of extension, a damping unit, having an outwardly peripheral retaining surface, and a second connector being fixed to the retaining surface, wherein the second connector extends along the axial direction of extension, wherein the second connector has a boundary surface on which an axle guide can be fixed, wherein the boundary surface has a second axial centre in the axial direction of extension, and wherein the first and the second axial centre are offset from each other along a vector of the axial direction of extension.

18 Claims, 6 Drawing Sheets

(52) U.S. Cl.
CPC ............... *B60G 2204/4108* (2013.01); *B60G 2204/4302* (2013.01); *B60G 2204/4402* (2013.01); *B60G 2206/601* (2013.01); *B60G 2206/73* (2013.01)

(56) References Cited

U.S. PATENT DOCUMENTS

| | | | |
|---|---|---|---|
| 2003/0067133 A1 | 4/2003 | Eveley | |
| 2008/0317394 A1* | 12/2008 | Blanke | B60G 7/02 384/138 |

FOREIGN PATENT DOCUMENTS

| | | | | |
|---|---|---|---|---|
| DE | 10024536 | A1 | 11/2001 | |
| DE | 102007016226 | A1 | 10/2008 | |
| DE | 102011054631 | A1 | 1/2013 | |
| DE | 102011107347 | A1 | 1/2013 | |
| DE | 102016206461 | A1 | 10/2017 | |
| DE | 102017012168 | A1 * | 8/2018 | .............. F16B 4/004 |
| DE | 102016012538 | B4 * | 5/2019 | .............. B60G 7/02 |
| FR | 3044599 | A1 | 6/2017 | |
| JP | S612711016 | A | 12/1986 | |
| JP | H10309916 | A * | 11/1998 | ........... B60G 21/052 |

* cited by examiner

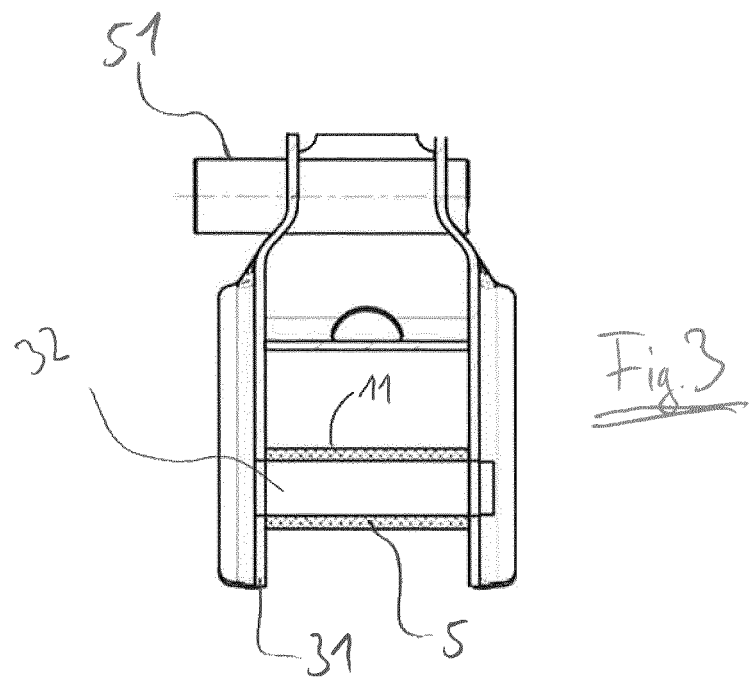
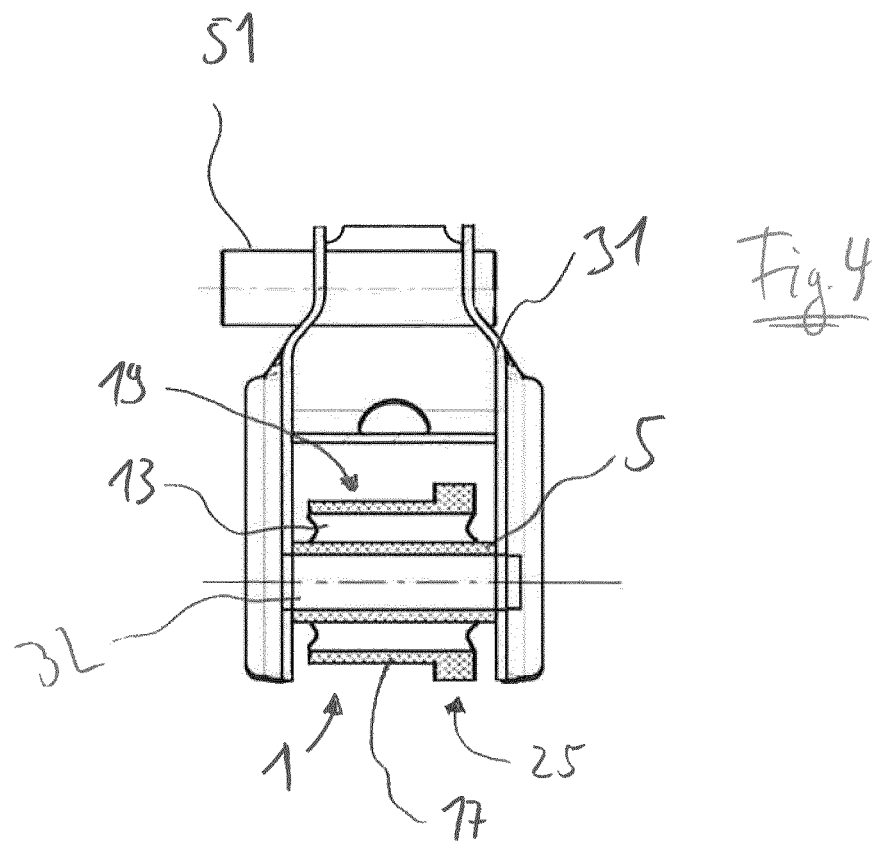

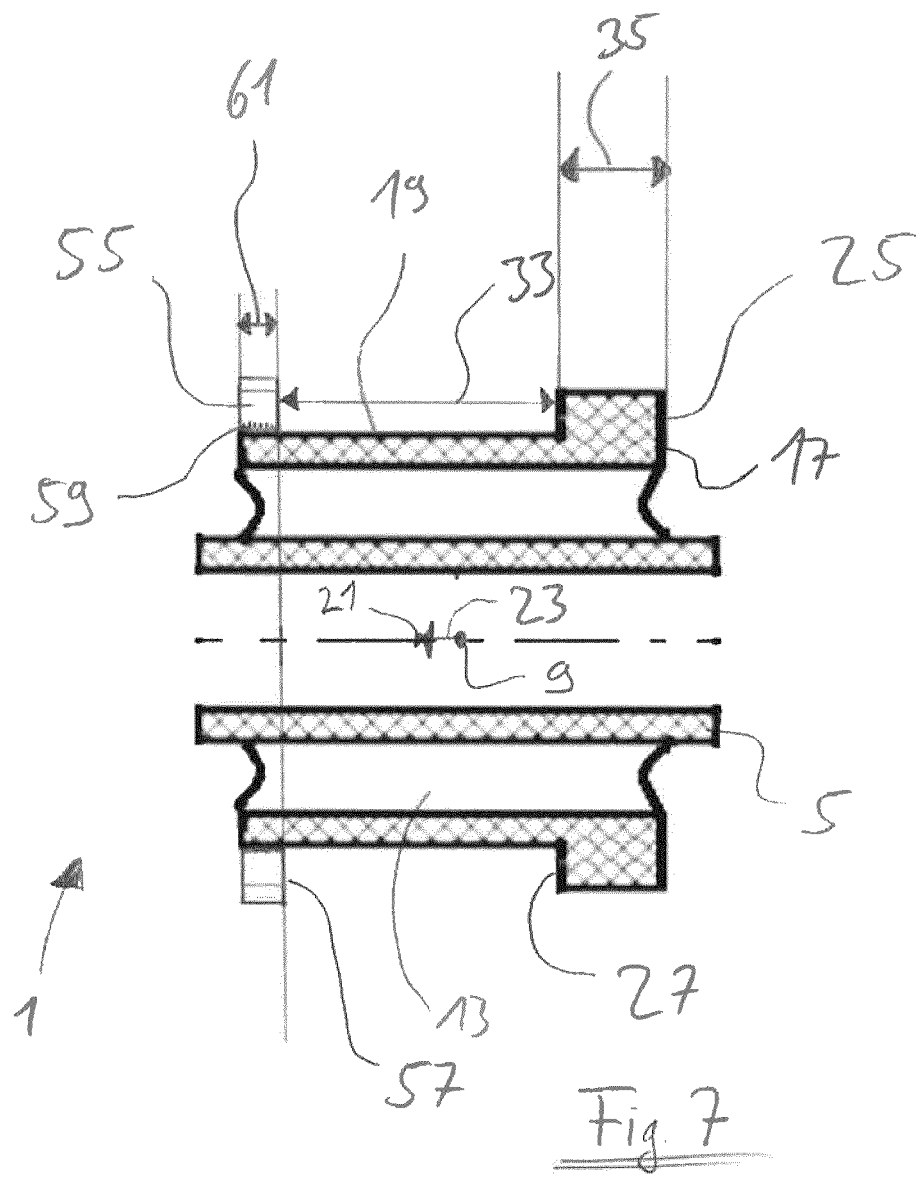

BEARING DEVICE FOR MOUNTING AN AXLE GUIDE

BACKGROUND OF THE INVENTION

The invention relates to a bearing device for mounting an axle guide and an axle suspension.

Axle suspensions are already known in the state of the art, which serve to fix an axle guide to a support frame by means of a bearing device. A matching bearing device and a matching retaining bracket are produced for each axle guide width. This means that only one type of axle guide can be attached to a retaining bracket. Therefore, when changing the axle guide width, both the bearing device and the retaining bracket as well as the existing mounting connections must be changed. This has the particular disadvantage that in the event of a delivery bottleneck or a subsequent adjustment of the axle guide, both the retaining bracket and the bearing device must be completely replaced.

It is therefore the object of the present invention to provide a bearing device and an axle suspension which significantly reduce the effort of changing an axle guide.

SUMMARY OF THE INVENTION

According to the invention, a bearing device for mounting an axle guide, in particular for commercial vehicles, comprises a first connecting means which has an axial direction of extension, the first connecting means having a first axial centre point in the axial direction of extension, the first connecting means forming an outwardly peripheral circumferential surface, a damping unit being fixed to the circumferential surface, the damping unit circumferentially surrounding the circumferential surface at least partially, the damping unit having an outwardly peripheral retaining surface, a second connecting means being fixed to the retaining surface, the second connecting means extending along the axial direction of extension, the second connecting means having a boundary surface on which an axle guide can be fixed, the boundary surface having a second axial centre in the axial direction of extension, the first and second axial centres being offset from one another along a vector of the axial direction of extension. In other words, the bearing device according to the invention serves to pivotally fix an axle guide to a retaining bracket by means of the bearing device. The first connecting means is preferably a type of tube or tube-like body, such as a bushing. In other words, the first fastening means may have a central recess which preferably extends in the axial direction of extension. The first connecting means preferably has two opposing planes on its outer sides or end faces, preferably parallel or approximately parallel to the inner surfaces of a retaining bracket. An axial direction of extension is preferably provided perpendicular to the two planes, wherein the axial direction of extension preferably leads through the radial centre of the first connecting means. Advantageously, the axial direction of extension is congruent with the axis of rotation, about which the axle guide to be fixed can rotate relative to the bearing bracket in an installed state. In other words, this can mean that the axial direction of extension corresponds to the axis of rotation of the axle guide relative to the bearing bracket. Furthermore, the axial direction of extension is preferably an axis, which is preferably the axis of symmetry of the first connecting means between the two planes. Furthermore, the first connecting means has a first axial centre, which is located on the axis of the axial direction of extension. The first axial centre is preferably defined by the maximum extension length of the first connecting means along the axis of the axial direction of extension, with the first axial centre being located centrally between the two end points of the first connecting means. Alternatively or additionally preferred, the first axial centre is the centre of the outwardly peripheral circumferential surface of the first fastening means in the direction of the axial direction of extension. As mentioned above, the first connecting means further has an outwardly peripheral circumferential surface, the first connecting means preferably being formed by a tube, wherein the outwardly peripheral circumferential surface may be formed by the outside of the tube. A damping unit is fixed to the circumferential surface of the first connecting means. The damping unit is preferably made of a resilient material, such as a rubber or rubber-like material, in particular an elastomer or elastomer composite, which is designed to damp. The damping unit at least partially encloses the circumferential surface, wherein "at least partially" means that the damping unit can also completely radially enclose the circumferential surface. In addition, the damping unit has an outwardly circumferential retaining surface, wherein the retaining surface is designed to fix a second connecting means. In a preferred embodiment, the first connecting means is designed as a kind of tube, wherein a tubular damping unit is fixed to the circumferential surface of the tube, which encloses 0.8 to 1.0 times the circumferential surface. In other words, this may mean that 80% to 100% of the circumferential surface is enclosed or covered by the damping unit. In this way, a particularly mechanically stable connection between the first connecting means and the damping unit can be achieved. It is particularly advantageous that a force transmission surface is present or created between the damping unit and the first connecting means. Preferably, the circumferential surface has the same length along the axial direction of extension as the retaining surface. This is advantageous, because the production of the damping unit is considerably facilitated, since no inclinations, which are expensive to produce, have to be provided on the damping unit. Alternatively, the damping unit can also have inclinations or similar curvatures on the outer edges, in particular the outer edges limiting in the axial direction of extension, since in a preferred embodiment the retaining surface exhibits 0.7 to 1.0 times the circumferential surface, so that the retaining surface is smaller than the circumferential surface. This has the advantage that in particular material is saved, in particular with smaller axle guides.

In addition, the bearing device has a second connecting means, which is preferably fixed to the retaining surface. The second connecting means is preferably a kind of tube or tube-like body, such as a bushing. In this case, the second connecting means encloses the retaining surface. Preferably the second connecting means may surround the retaining surface in a ratio of 0.5 to 1.0, preferably 0.7 to 1.0 of the retaining surface. This has the advantage that the second connecting means can be fixed to smaller axle guides without a high level of design complexity. The second connecting means preferably extends along the axial direction of extension. The second connecting means is preferably designed in a ratio of 0.5 to 1.0 to the first connecting means. This has the advantage that a volume is created in which the second connecting means can be displaced in relation to the first connecting means and the second connecting means cannot abut against an adjacent component, such as a retaining bracket. Furthermore, it is preferred that the second connecting means has a boundary surface to which an axle guide can be fixed, in particular can be applied in a supporting manner, or can be applied in a contacting manner. The boundary surface is provided on the circumferential outer surface of the second connecting means. The limiting surface extends in an extension length along the axial direction of extension, preferably in a ratio of 0.5 to 1.0 of the extension length of the second connecting means. This is particularly advantageous because the boundary surface can be used to offset, in other words to displace the arrangement of the axle guide, which is fixed to the second connecting means. In this way, additional installation space can be created, as well as an increased interchangeability of axle guides on one type of retaining bracket. An axle guide is preferably a trailing arm or alternatively a transverse control arm, which is preferably designed for use in a commercial vehicle. The boundary surface preferably has a second axial centre, which lies on the axis of the axial direction of extension. The second axial centre is preferably located in the middle between the end points of the boundary surface. Between the first and the second axial centre there is a vector which describes the axial offset between the first and the second axial centre along the axial direction of extension. The vector expresses in which direction and with which distance the first and the second axial centre is spaced. In an advantageous embodiment, the vector describes an offset between the first and second axial centres of between 1 mm and 40 mm, more preferably between 10 mm and 25 mm.

Preferably, the first connecting means is fixed or arranged on a bolt of a retaining bracket and has a circumferential surface on its outside, which is completely enclosed by the damping unit. On its outside, the damping unit has a retaining surface which is preferably less than 0.9 times the circumferential surface. A connecting means is arranged on the retaining surface, which completely encloses the retaining surface and has a boundary surface on its outside, which is preferably less than 0.8 times the retaining surface. The boundary surface has an axle guide, wherein the axle guide completely encloses the boundary surface and thus the centre of the suspension arm as well as the centre of the boundary surface is spaced along the axial direction of extension from the axial centre of the first connecting means. The advantage is that a directed offset can be achieved using the bearing device. Furthermore, it is advantageous that by means of the bearing device a multitude of different axle guides can be fixed to one type of retaining bracket, because by means of the second connecting means a multitude of different axle guides can be fixed. This means that it is no longer necessary to replace a retaining bracket if another type of axle guide is to be used, nor do any aggregate connections or bores or the like have to be moved. A particular advantage is that a different axle guide can be fitted to the same retaining bracket than originally intended at short notice, thus saving on assembly work. In addition, the offset of the axle guide to the retaining bracket creates additional space on the wheel hub and for parts adjacent to wheel hubs.

In a preferred embodiment, the second connecting comprises has a positioning portion, the positioning portion forming a stop surface adapted to accomplish positional locking of the axle guide. The contact surface preferably has a normal which is parallel to the axial direction of extension. This can be used to avoid transverse loading in particular when the axle guide hits the stop surface. The positioning portion is preferably an element on the peripheral outer side of the second connecting means, which is created by the fact that the boundary surface does not completely enclose the outer surface of the second connecting means. Thus, the boundary area is provided on a remainder of the outer surface of the second connecting means. The positioning portion is preferably a bulge which is located on the remaining surface and extends orthogonally to the axial direction of extension or is spaced from the boundary surface. In particular, the positioning portion may consist of a radially circumference embossing which is provided on the outside of the second connecting means and projects from the boundary surface in a direction orthogonal to the axial direction of extension, in particular between 5 mm and 60 mm, more preferably between 10 mm and 30 mm. In other words, the positioning portion can be designed as a kind of radial projection of the second connecting means. Preferably, the positioning portion is or has a stop surface and is preferably designed as a rectangular body in its cross-section, the stop surface preferably being orthogonal to the axial direction of extension. The stop surface preferably directly adjoins the boundary surface, but is designed at right angles to the boundary surface. This forms a stop for an axle guide. The positioning portion secures the position of the axle guide by pressing an axle guide against the stop surface of the positioning portion and thus prevents it from slipping or shifting or similar in at least one direction. The positioning portion is advantageously formed in one piece with the second connecting means, in particular by a casting process. The advantage of this embodiment is that the positioning portion forms a shape with the aid of simple means, which is suitable for securing the position of the axle guide and offers a particularly high degree of safety. By varying the extension length of the positioning portion along the axial direction of extension, an axle guide can be offset in a directed manner, in particular in a displacement direction which runs against the stop surface.

Advantageously, the positioning portion and the second connecting means are designed in one piece. "One-piece" means that the positioning portion and the second connecting means are formed from one and the same component. This can be achieved in particular by a manufacturing process such as casting, in particular die casting or gravity die casting. The advantage of the die-casting process is that with the help of a low cycle time, a high degree of economic efficiency can be achieved in the production of the second connecting means and the positioning portion. The advantage of the gravity die casting process is that a high variety of materials can be used, in particular of metal and/or aluminium alloys. In an alternative embodiment, the second connecting means and the positioning portion may also be made of a plastic or plastic composite, in particular with a glass fibre or carbon fibre reinforcement, which has the advantage that a wide variety of materials can be used cost-effectively. In a concrete exemplary embodiment, the second connecting means with the positioning portion is designed as a one-piece casting, wherein this was produced using a die-casting process. Subsequently, preferably the positioning portion and the outer surface and/or inner surfaces of the second connecting means can be reworked using a separating manufacturing process such as milling or turning.

Alternatively, the positioning portion and the second connecting means are designed multipiece, wherein these are connected to each other either in a detachable or non-detachable manner. Multipiece means that the positioning portion and the second connecting means consist of two different components. The two components may have been manufactured using the same or different production processes. The positioning portion and the second connecting means can also be made of different materials. The advantage of the different materials is that the different materials can be adjusted to each other and thus additional properties such as rust protection or similar can be provided. Preferably, the positioning portion and the second fastener are connected in a detachable manner. A detachable connection is in particular a screw connection or another form-fitting and/or force-locking connection such as bayonet lock, bolts, pins, set screws, feather keys or a press fit, which has been produced by means of shrinking. Alternatively, the positioning portion and the second connecting means are connected with each other in a non-detachable manner, in particular non-positively and/or materially by means of a manufacturing process such as welding, riveting or gluing. The advantage of the non-detachable connection is that a high degree of manufacturing efficiency can be achieved by means of a simple, insensitive manufacturing process such as welding.

In an advantageous embodiment, the positioning portion and the second connecting means are connected to each other by means of a force-, friction-, form- and/or material-locking connection. A force-locking connection is preferably a screw connection, wherein a thread is provided on the outside of the second connecting means, wherein the positioning portion also has a thread on its inside and the positioning portion and the second connecting means are screwed together by means of these two threads. A friction-locking connection is preferably a connection between the second connecting means and the positioning portion, which is defined by the coefficients of friction of the surfaces of the two components, such as a coated surface or, for example, a knurled surface. Alternatively, the connection between the second connecting means and the positioning portion can be made by means of a form-locking connection, e.g. a bayonet lock. The advantage of a bayonet lock is that the connection can be made by means of a simple assembly step. In another alternative embodiment, the connection between the second connecting means and the positioning portion is made by means of a material-locking connection, wherein the material-locking connection is preferably a welded connection. Welding is preferably a friction welding process, whereby the positioning portion and the second connecting means are joined together. The material-locking connection has the particular advantage that a durable and robust connection can be produced with simple means. In an exemplary embodiment, the positioning portion and the second connecting means are connected to each other by means of a material-locking connection by welding, in particular friction welding or ultrasonic welding.

In an advantageous embodiment, the first and/or second connecting means and/or the damping unit are designed coaxially to each other. A coaxial design of the first and/or second connecting means and/or the damping unit is preferably understood to mean that the axes of rotation of the three components (first, second connecting means and/or damping unit) lie one above the other. In a two-dimensional view of the first and/or second connecting angle and/or the damping unit, the three components are preferably designed concentric to each other. In particular, it is preferred that the axial directions of extension of the three components all lie on the same axis. This has the advantage that no unbalance can occur in the bearing device, as the bearing point extends along the axial direction of extension.

In another preferred embodiment, the first and second connecting means, the damping unit and the positioning portion extend as an annular body along the axial direction of extension. An annular body in this case is understood to be a tube or tube-like body. Alternatively, an annular body can also be understood as a box profile, which extends along the axial direction of extension. It is also conceivable that a combination of tubular and box-shaped profiles can form the bearing device, wherein, for example, the first connecting means is designed as a box profile, the damping unit is designed as a kind of adapter from a box profile to a tubular profile and the second connecting means is designed as a tubular profile. The advantage of this embodiment is that axle guides can also be fixed to a retaining bolt which has a box profile. In general, an annular body is understood to be any cross-sectional contour which has no interruption in its profile.

In a further advantageous embodiment, the first connecting means has a recess for attachment, in particular for mounting, to a retaining bracket, the recess extending along the axial direction of extension. Preferably, the recess for attachment, in particular for mounting, to a retaining bracket is a hole provided in the first connecting means. The recess is preferably designed in dependence on a retaining pin of a retaining bracket, wherein the recess preferably has a transition fit to the retaining pin. Alternatively, a clearance or press fit can also be provided. The recess preferably extends along the axial direction of extension of the first connecting means. Preferably, the first connecting means is a profile body which extends along the axial direction of extension and thereby has a recess along the axial direction of extension, wherein the recess changes the first connecting means in such a way that a tube or a box profile is produced. Particularly preferably, the first connecting means is designed as a kind of tubular profile, the inside of the tubular profile being formed by the recess. This has the advantage that by means of a simple connection between the retaining pin of the retaining bracket and the recess of the first connecting means, the bearing device can be placed against the retaining bracket and thus a very low assembly effort is required.

In a further, preferred embodiment, the second connecting means has a second positioning portion, the second positioning portion having a second stop surface adapted to secure the axle guide in position, the second stop surface preferably being substantially parallel to the first stop surface. The second positioning portion is preferably located at the second connecting means and wherein the second positioning portion is preferably located on the other side of the second connecting means as the first positioning portion, in particular opposite the first. The second positioning portion is preferably designed multipiece to the second connecting means, wherein the second positioning portion is detachably attached to the second connecting means. In particular, the second positioning portion is a kind of nut or nut-like component which can be applied to a thread provided on the second connecting means. In a preferred embodiment, the second positioning portion has a second stop surface which is designed to secure the axle guide in its location or its position. In particular, the second stop surface is configured to limit slippage or movement of the axle guide in at least one direction. The second stop surface is arranged substantially parallel to the first stop surface, wherein "substantially parallel" means that the first and second stop surfaces are preferably designed parallel to each other or alternatively are designed at an angle of between 0° and 5° to each other. In an exemplary embodiment, the first positioning portion is designed in one piece with the second connecting means, the second connecting means having a thread opposite the first positioning portion to which the second positioning portion can be attached, in particular if the second positioning portion is designed as a kind of nut. In this embodiment, the axle guide is secured three-dimensionally by means of the first and second stop surfaces and by the second connecting means, so that the axle guide is forced into its position. The advantage of this embodiment is that three-dimensional securing is achieved, which requires little assembly work, since only the second positioning portion has to be arranged.

In a preferred embodiment, the boundary surface has a first extension length in its axial direction of extension, wherein the positioning portion has a second extension length in its axial direction of extension, wherein the ratio of the second to the first extension length is between 0.01 and 0.4. Preferably, the ratio between the first and second extension length describes the distribution of the positioning portion to the boundary surface over the entire extension length of the second connecting means along the axial direction of extension. The first extension length is preferably the extension length formed by the end points of the boundary surfaces along the axial direction of extension. These end points are preferably defined as the first extension length by means of a vector and its length or amount. The second extension length is preferably the extension length which is formed by the end points along the axial direction of extension of the positioning portion, which is also a vector between the two end points of the positioning portion and its magnitude. In a preferred embodiment, the ratio between the second and first extension length is 0.01 and 0.4, but more preferred is 0.1 to 0.25. The advantage of this embodiment is that by means of the extension length and its definition, an axle guide can be positioned along the axial direction of extension in such a way that beneficial effects such as the creation of additional installation space or similar can be achieved.

In a preferred embodiment, the vector between the first and second axial centres is symmetrical to the ratio of the first and second extension lengths. Symmetrical means that the vector has the same length as the width of the positioning portion and thus corresponds to the second extension length. In other words, the width of the positioning portion corresponds to the length of the vector. This is particularly advantageous, since the offset of the axle guide can be achieved by varying the width of the positioning portion and thus an offset can be carried out, which is associated with low production costs.

In an alternative embodiment, the vector between the first and second axial centre is asymmetrical to the ratio of the first and second extension length. "Asymmetrical" here means that the vector does not have the same length as the width of the positioning portion along the axial direction of extension. In an exemplary embodiment, the vector offsets the axle guide by at least 20 mm, wherein the width of the positioning portion is at least 10 mm. Thus, a second boundary surface is formed on the second connecting means. It is advantageous to have a further axle guide on the second boundary surface. A further advantage is that by reducing the width of the positioning portion, material is saved on the second connecting means.

Preferably, the first connecting means has a third extension length in its axial direction of extension, the second connecting means has a fourth extension length in its axial direction of extension, the ratio between the third and fourth extension lengths being 0.7 to 1.3. In other words, the first and second connecting means are not of equal length. In particular, the second connecting means is preferably shorter than the first connecting means. This has the advantage that the second connecting means is permanently spaced from the retaining bracket and therefore no vibrations and/or shocks can be transmitted from the axle guide directly to the retaining bracket. Alternatively, the second connecting means can be longer than the first connecting means, in which case the first connecting means does not rest on the retaining bracket. In addition, the second connecting means is spaced from the retaining bracket so that no vibrations and/or shocks can be transmitted. The advantage of this embodiment is that by means of the short first connecting means, the second connecting means and the damping unit, the bearing device can better dampen a rotation of the axle guide.

Further, according to the invention, an axle suspension comprises an axle guide and a retaining bracket, the axle beam being fixed to the retaining bracket by means of a bearing device, the bearing device securing an axial centre of the retaining bracket to an axial centre of the axle guide. An axle guide is preferably a transverse or longitudinal control arm for a commercial vehicle. Expediently, the bracket comprises a retaining pin and can preferably be arranged on a body of a commercial vehicle. The retaining bracket preferably has two opposing inner surfaces, each of which preferably forms a boundary plane, wherein the retaining bolt is preferably fixed vertically and between the boundary planes. Preferably a bearing device is arranged on the retaining bolt, in that the bearing device has a recess into which the retaining bolt of the retaining bracket can be inserted and thus the bearing device can be mounted on the retaining bracket by means of the retaining bolt. An axle guide is fixed to the bearing device, the axle guide preferably having a recess which can be placed against the boundary surface of the bearing device. The bearing device is designed in such a way that it secures the axial centre of the bracket at a distance from the axial centre of the axle guide fixed to it. The axial direction of the retaining bolt and/or bracket is preferably an axis which is perpendicular to the boundary planes and further preferred is this axis equal to the axis of rotation of the retaining bolt. The axial centre of the support is located centrally between the two boundary planes and on the axis of rotation of the retaining bolt. The axial centre of the axle guide is preferably defined by the fact that the axle guide has a recess which serves for fixing to the bearing device and this recess forms an axis due to its rotational symmetry. This axis is limited by the end points of the axle guide and their projections onto the axle. The axial centre of the axle guide is located between the end points. The axial centre of the retaining bracket is spaced from the axial centre of the axle guide, in particular along the axial direction of extension of the bearing device. Furthermore, the bearing device is designed to secure the axle guide in such a way that the axial centre of the retaining bracket and the axial centre of the axle guide remain at a defined distance from each other, especially in the event of vibrations or if force and/or torque is applied to the axle guide. The advantage of this embodiment is that by means of the bearing device, an axle guide can be offset in relation to the retaining bracket, so that the axle guide can be displaced in one direction and the same type of retaining bracket can still be used. This has the particular advantage that when changing the axle guide, which does not have the same axle guide width, it is not necessary to change the retaining bracket and its holes and connecting devices provided for this purpose, but only to attach another bearing device to the retaining bracket in order to mount the new axle guide, which reduces the costs and the mounting effort of the new axle guide.

In a preferred embodiment, the axle suspension comprises an air spring, said air spring having a centre in the axial direction of extension, said axial centre of the air spring being spaced from the axial centre of the retaining bracket. In other words, with respect to the axial direction of extension of the bearing device, the air spring has an axial centre which is defined by the in particular circular cross-section of the air spring and its rotational symmetry. In other words, the axial centre of the air spring is the circular centre of the preferably circular cross-section of the air spring and its projection onto the axial direction of extension of the bearing device. The axial centre of the air spring is at a distance from the axial centre of the retaining bracket. This spacing allows additional installation space to be generated, which can be used advantageously for accommodating further components and thus creates a considerable advantage in packaging.

It is preferable that the bearing device rests on the retaining bracket, wherein the axle guide is spaced from the retaining bracket. Preferably the bracket has an inner surface on which the bearing device is mounted. This is preferably designed in such a way that the bearing device cannot slide along a retaining pin of the retaining bracket, so that the bearing device and the inside of the retaining bracket are in contact with each other. Furthermore, it is preferred that the axle guide is positioned so that it does not touch the inner surface of the retaining bracket. This is achieved by the fact that preferably the bearing device has a second connecting means, which preferably has a smaller extension length than the first connecting means and thus the second connecting means is spaced from the inner surfaces of the retaining bracket on its side surfaces. The axle guide is preferably attached to the second connecting means in such a way that it is arranged in a secure position. This is particularly advantageous as the axle guide is spaced from the inner surface of the retaining bracket and thus no direct transmission of shocks or vibrations to the retaining bracket can take place.

BRIEF DESCRIPTION OF THE DRAWINGS

The invention shall now be explained in more detail by means of exemplary embodiments with reference to the enclosed drawings. In the figures, the same or corresponding elements are marked with the same reference signs. It is shown in:

FIG. 3 shows a schematic view of a retaining bracket with a part of a bearing device according to a third embodiment;

FIG. 4 shows a schematic sectional view of a retaining bracket with a bearing device according to a fourth embodiment;

FIG. 7 shows a schematic sectional view of a bearing device according to a seventh embodiment.

DETAILED DESCRIPTION OF THE PREFERRED EMBODIMENTS

Figure 1:
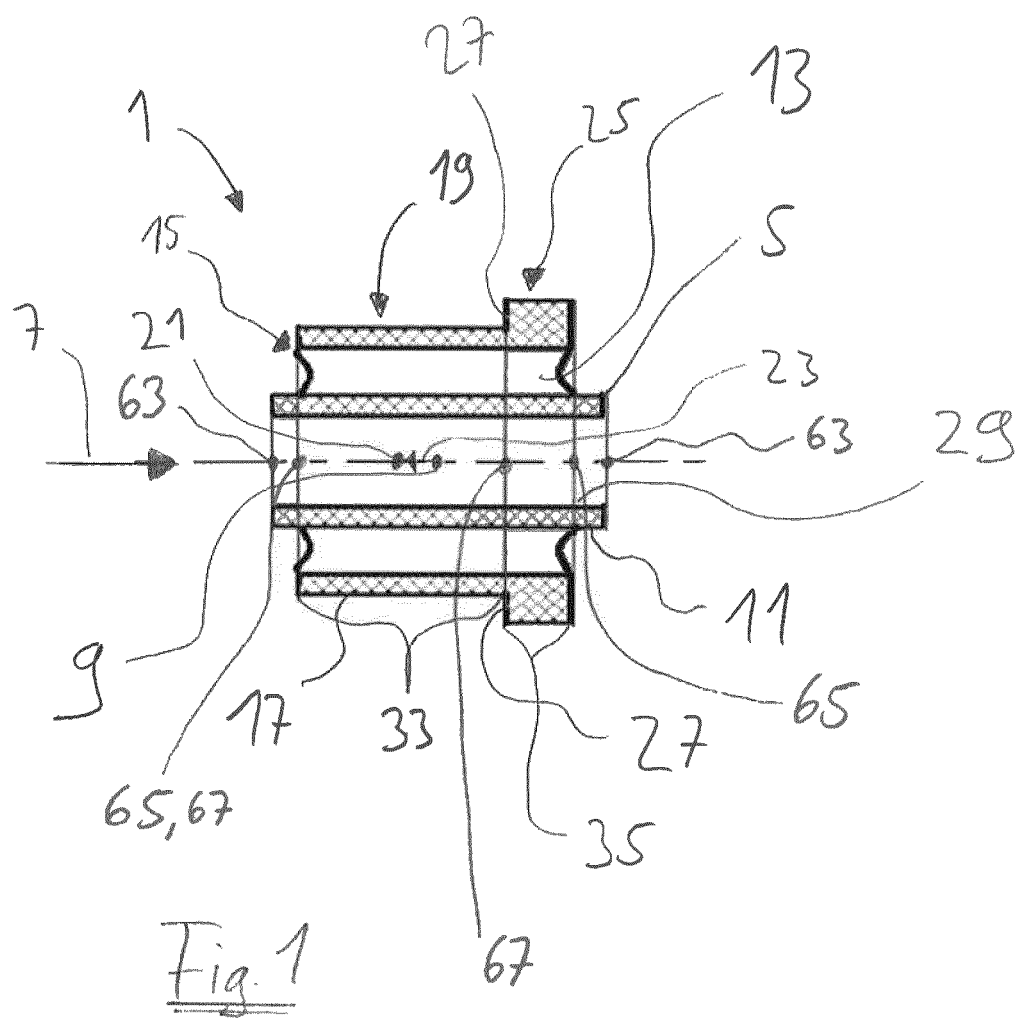
FIG. 1 shows a schematic sectional view of a bearing device according to a first embodiment.

FIG. 1 shows a schematic sectional view of the bearing device 1. The bearing device 1 comprises a first connecting means 5, a damping unit 13 and a second connecting means 17. The first connecting means 5 has an axial direction of extension 7. The first connecting means 5 has a first axial centre point 9, which is located on the axial direction of extension 7. The first axial centre 9 is defined by the first connecting means 5 by providing the first axial centre 9 centrally between the end points 63 of the first connecting means in the axial direction of extension 7. The first connecting means 5 has a circumferential surface 11, which is formed by the outside of the first connecting means 5. The circumferential surface 11 is partially enclosed by a damping unit 13. The damping unit 13 has a retaining surface 15 to which the second connecting means 17 is fixed. The second connecting means 17 can completely or partially enclose the retaining surface 15. The extension length of the second connecting means 17 is defined by the two end points 65 on the axial direction of extension 7. The second connecting means 17 has a boundary surface 19, which is designed to fix an axle guide 3. The second connecting means 17 also has a positioning portion 25, which has a stop surface 27. As can be seen in FIG. 1, the stop surface 27 is orthogonal to the boundary surface 19. The stop surface 27 is used to secure an axle guide 3, which is not shown in FIG. 1, in its position. In particular, the stop surface 27 serves to limit an axle guide 23 against slipping in one direction. Furthermore, the first connecting means 5 has a recess 29. The recess 29 is designed so that a retaining bolt of a retaining bracket 31 can be fixed to it. Furthermore, the second connecting means 17 has a first extension length 33, which is defined by the projection surface of the limiting surface 19 along the axial direction of extension 7. Furthermore, the boundary surface 19 has a second axial centre 21. The second axial centre is defined by the end points 67 of the boundary surface 19, the second axial centre being located centrally between the end points 67 of the boundary surface 19 in the axial direction of extension 7. The first axial centre 9 and the second axial centre 21 are offset from each other by means of a vector 23. The distance between the first 9 and the second 21 axial centre can be described by means of the vector 23, so that an offset of an axle guide by means of the bearing device 1 takes place. Furthermore, the positioning portion 25 has a second extension length 35, which is defined by its end points along the axial direction of extension 7. Preferably, the second extension length is exactly the same length as the vector 23. In an alternative embodiment, the second extension length 35 can also have a different length as the vector 23.

Figure 2:
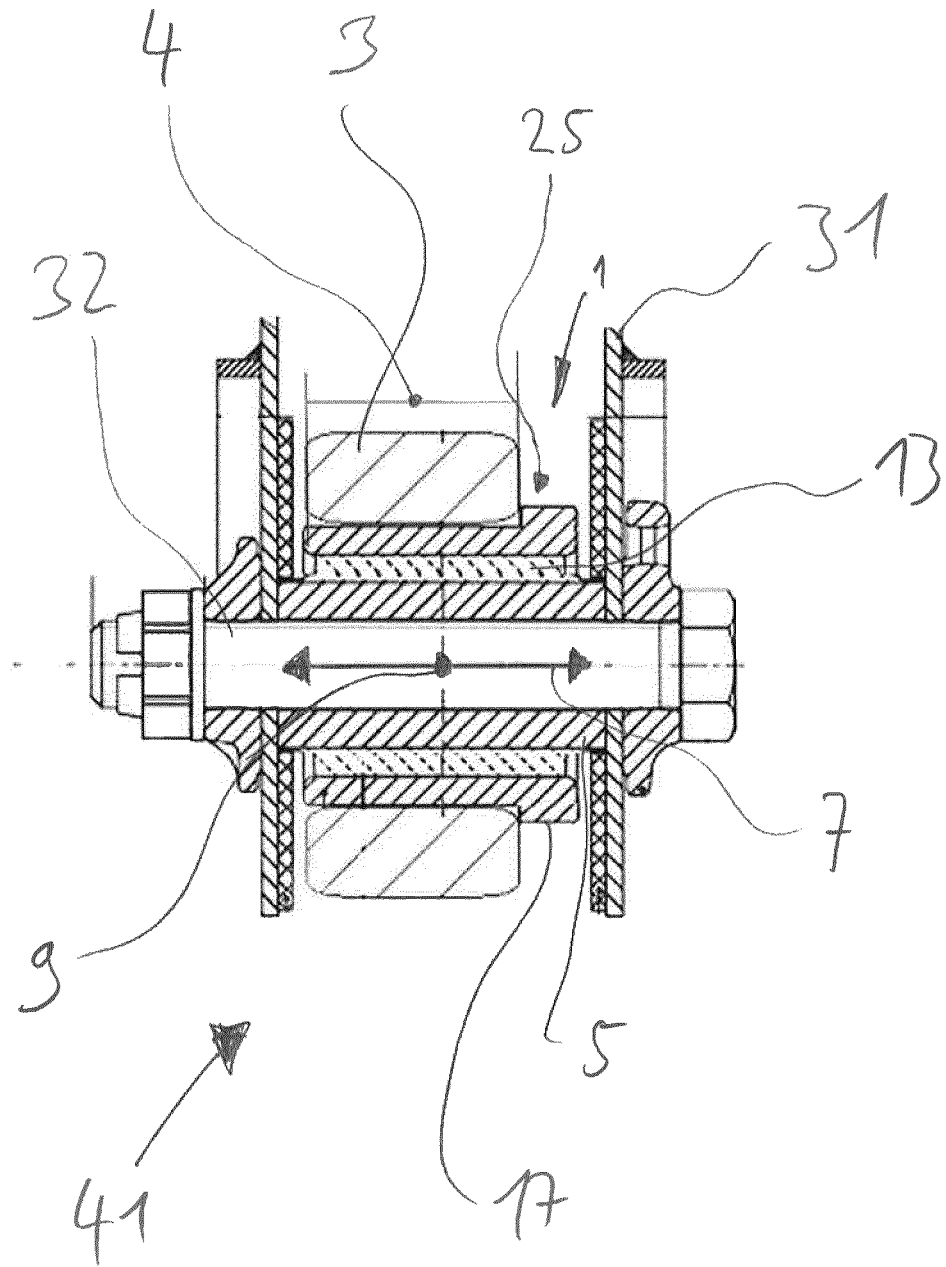
FIG. 2 shows a schematic sectional view of a bearing device with a retaining bracket and an axle guide according to a second embodiment.

FIG. 2 shows a schematic sectional view of a retaining bracket 31 with a retaining bolt 32, a bearing device 1 and an axle guide 3, with the bearing device 1 being attached to the retaining bracket 31 by means of the retaining bolt 32. The bearing device 1 is preferably provided with an axle guide 3. The axle guide 3 is fixed to the second connecting means 17 and is offset by means of the positioning portion 25. Offset preferably means that the centre of the axle guide is at a distance from a centre of the first connecting means or the retaining bracket 31. In addition, the first and second connecting means as well as the damping unit 13 have an axial direction of extension 7, which is coaxial with the retaining bracket 32. In particular, FIG. 2 shows a section of an axle suspension 41.

FIG. 3 shows a schematic sectional view of a mounting bracket 31, comprising a mounting bolt 51, which serves to fix a damper not shown, and a mounting bolt 32, to which a first connecting means 5 is fixed. The first connecting means 5 has a peripheral circumferential surface 11 against which a damping unit 13 can be placed.

FIG. 4 shows a schematic sectional view of a retaining bracket 31 with a bearing device 1. The retaining bracket 31 comprises a retaining bolt 32, to which a first connecting means 5 is attached. The first connecting means 5 is surrounded by a damping unit 13, to which a second connecting means 17 is attached. The second connecting means 17 has an outer peripheral boundary surface 19 and a positioning portion 25. The positioning portion 25 is designed to secure an axle guide in a position, wherein the axial centre of the retaining bracket 31 is spaced from an axial centre of the axle guide or the second axial centre.

Figure 5:
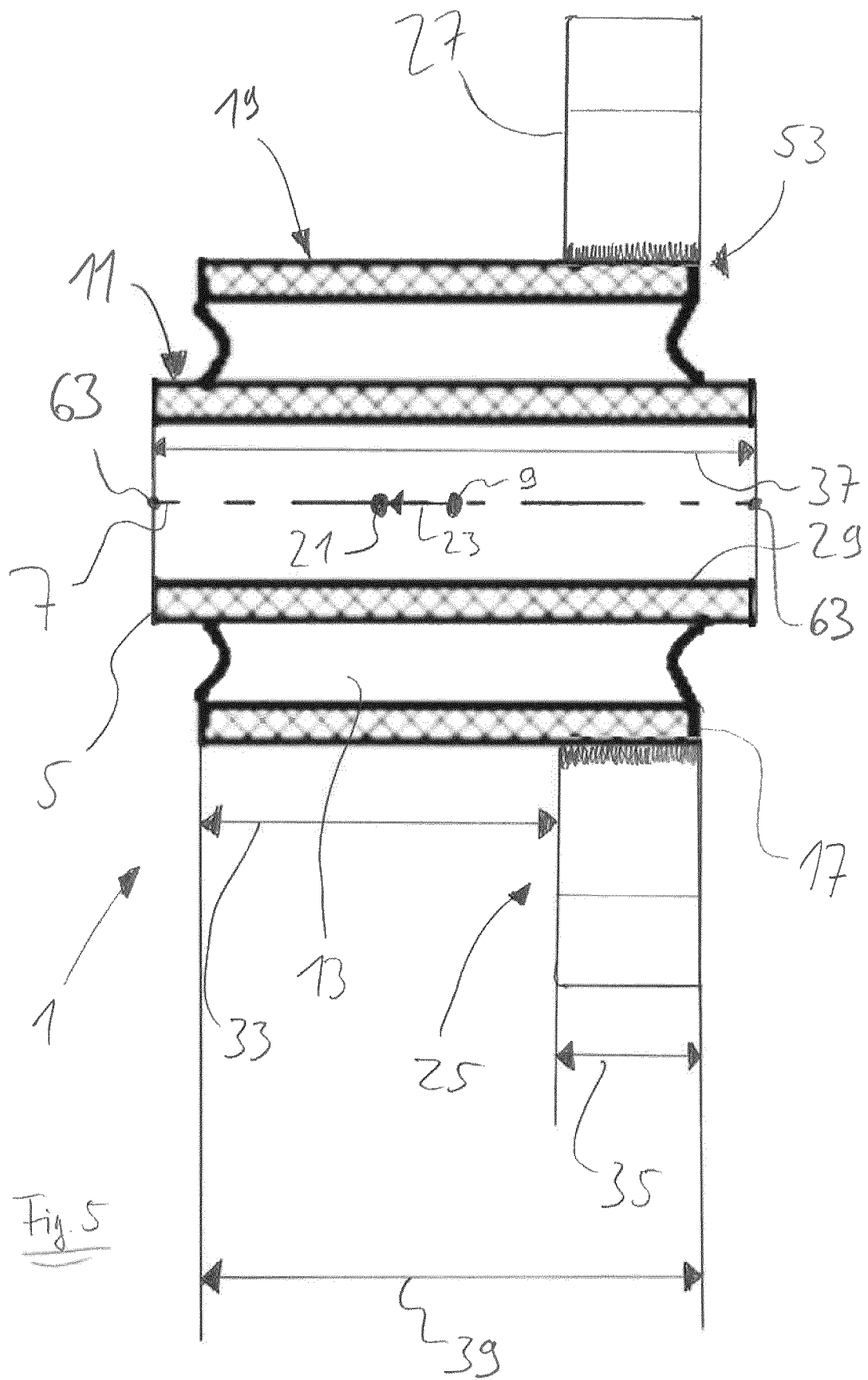
FIG. 5 shows a schematic sectional view of a bearing device according to a fifth embodiment.

FIG. 5 shows a bearing device according to a preferred embodiment, wherein the positioning portion 25 and the second connecting means 17 are designed to be detachable in several parts. The second connecting means 17 has a connection 53, which connects the second connecting means 17 with the positioning portion 25, which is designed as a kind of nut. The connection 53 is preferably designed as a kind of screw connection, wherein the positioning portion 25 has a kind of thread on its inside, which can engage in a counterpart provided for this purpose on the second connecting means 17. In addition, the second connecting means 17 has a boundary surface 19, which forms a second axial centre 21. The second axial centre 21 is spaced along a vector 23 from the first axial centre 9. The first axial centre 9 is defined by the first connecting means 5. The first connecting means 5 has a third extension length 27 which is defined by the end points of the connecting means along the axial direction of extension 7. The first axial centre is in the middle of the third length 37, which is defined by the end points 65 of the second connecting means 17. Preferably, the second connecting means 17 has a fourth extension length 39, wherein preferably the fourth extension length 39 is smaller than the third extension length 37. This has the advantage that the second connecting means 17 is at a distance from the retaining bracket 31. Furthermore, the boundary surface 19 has a first extension length 33, which is limited by the width along the axial direction of extension 7 of the boundary surface 19. The positioning portion 25 has a second extension length 35, which is defined by the width of the positioning portion 25 along the axial direction of extension 7. Preferably, the second extension length 35 is the same length as the vector 23. In a preferred embodiment, the second connecting means 17 is cast and then a thread is cut by means of a thread cutter, so that a positioning portion 25 can be applied to the thread of the connecting means 17, which is formed by a nut or a nut-like component. The positioning portion, which is designed as a nut or nut-like component, has a stop surface 27, which is preferably designed orthogonal to the boundary surface 19. The stop surface 27 secures the position of the axle guide 3 along at least one direction of the axial direction of extension 7.

Figure 6:
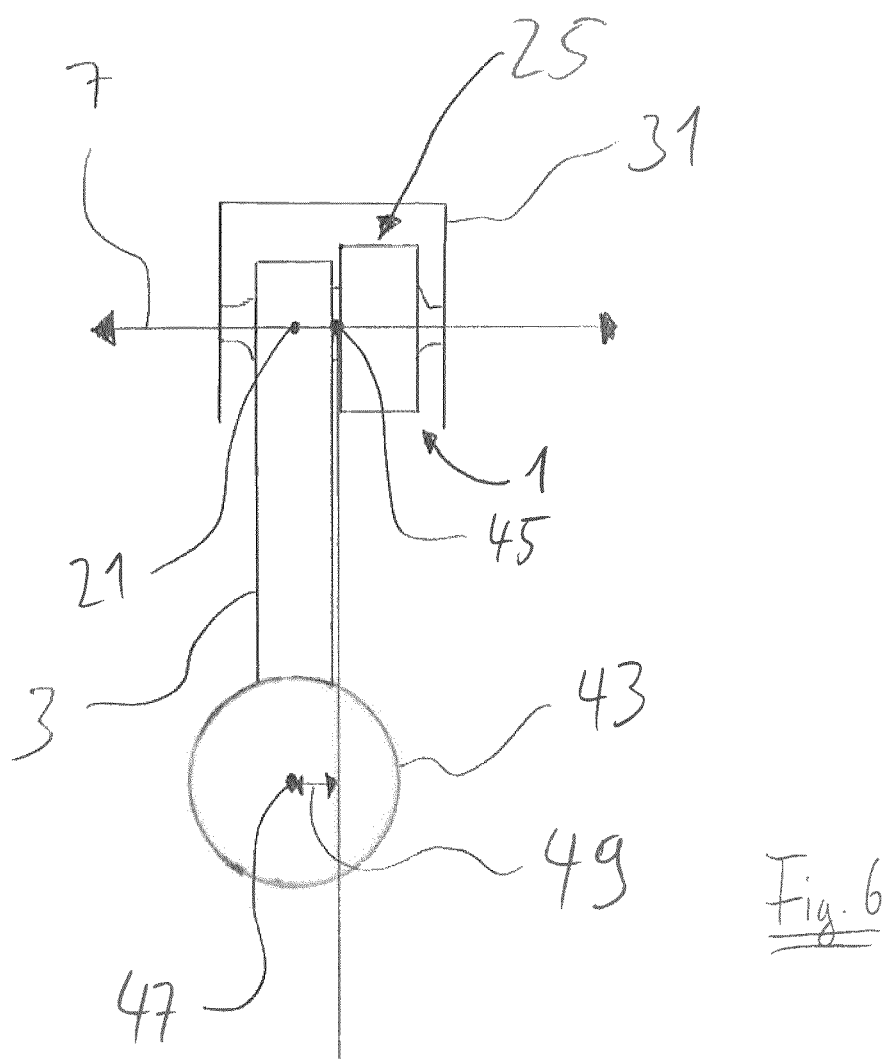
FIG. 6 shows a schematic top view of an axle suspension according to a sixth embodiment.

FIG. 6 shows a schematic top view of an axle suspension. The retaining bracket 31 forms an axial centre 45. In addition, the retaining bracket 31 defines a bearing device 1. The bearing device 1 has a positioning portion 25, which offsets an axle guide 3. The axle guide 3 has an axial centre which corresponds to the second axial centre 21 of the boundary surface 19. The second axial centre 21 is spaced from the first axial centre or the axial centre of the retaining bracket 45. An air spring 43 is also provided on the axle guide 3. The air spring also has an axial centre 47, which is at a distance from the axial centre of the retaining bracket 45. The distance 49 is shown schematically in FIG. 6 between the axial centre of the retaining bracket 45 and the axial centre of the air spring 47.

FIG. 7 shows a preferred embodiment of the bearing device 1, wherein the bearing device 1 has a first connecting means 5, a damping unit 13 and a second connecting means 17. The second connecting means comprises a first positioning portion 25 and a second positioning portion 55, the first positioning portion 25 having a first stop surface 27 which is orthogonal to the boundary surface 19. The first positioning portion 25 and the second connecting means 17 are designed in one piece. The second positioning portion 55 and the second connecting means 17 are made in multi-pieces, which are connected to each other by means of the connection 59. The connection 59 is preferably a screw connection, wherein the second positioning portion 55 and the second connecting means 17 each have a thread which can engage in each other. The second positioning portion 25 forms a second stop surface 57, on which an axle guide 3 can be positioned and secured. Preferably the second stop surface 57 secures the axle guide in at least one direction, preferably hitting against it. In addition, the second positioning portion 55 has an extension length 61 along the axial direction of extension 7. The extension length 61 influences the extension length 33 of the boundary surface 19 and thus the second axial centre 21. In addition, an axle guide 3 can be secured three-dimensionally with the first and second positioning portion and the second connecting means 17, since all degrees of freedom are secured by these three elements.

LIST OF REFERENCE SIGNS

1—bearing device
3—axle guide
4—Centre of axle guide
5—first connecting means
7—axial direction of extension
9—first axial centre
11—circumferential surface
13—damping unit
15—retaining surface
17—second connecting means
19—boundary surface
21—second axial centre
23—vector
25—positioning portion
27—stop surface
29—recess
31—retaining bracket
32—retaining bolt
33—first extension length
35—second extension length
37—third extension length
39—fourth extension length
41—axle suspension
43—air spring
45—axial centre of the retaining bracket
47—axial centre of the air spring
49—distance between the axial centre of the retaining bracket and the air spring
51—mounting bolts
53—connection
55—second positioning portion
57—second stop face
59—connection of second positioning portion
61—extension length of second positioning portion
63—end points of first connecting means
65—end points of second connecting means
67—end points of boundary surface

The invention claimed is:
1. A bearing device for mounting an axle guide for commercial vehicles, comprising:
a first connector which has an axial direction of extension and a first axial center in the axial direction of exten- sion, wherein the first connector forms an outwardly peripheral circumferential surface;
a damping unit fixed to the circumferential surface, wherein the damping unit at least partially peripherally surrounds the circumferential surface, and wherein the damping unit has an outwardly peripheral retaining surface; and
a second connector fixed to the retaining surface;
wherein the second connector extends along the axial direction of extension;
wherein the second connector has a boundary surface on which an axle guide is configured to be fixed in a supporting manner;
wherein the boundary surface has a second axial center in the axial direction of extension;
wherein the first and second axial centers are offset from each other along a vector of the axial direction of extension;
wherein the second connector comprises a positioning portion;
wherein the boundary surface has a first extension length in the axial direction of extension of the boundary surface;
wherein the positioning portion has a second extension length in the axial direction of extension of the positioning portion; and
wherein the ratio of the second to the first extension length is between 0.01 and 0.4.

2. The bearing device according to claim 1, wherein the positioning portion includes a stop surface configured to effect positional locking of the axle guide.

3. The bearing device according to claim 2, wherein the positioning portion and the second connector comprise one piece.

4. The bearing device according to claim 2, wherein the positioning portion and the second connector comprise multiple pieces, and wherein the multiple pieces are connected to each other in a detachable or non-detachable manner.

5. The bearing device according to claim 4, wherein the positioning portion and the second connector are connected to each other by a force-locking, friction-locking, form-locking and/or material-locking connection.

6. The bearing device according to claim 1, wherein the first connector and/or the second connector and/or the damping unit are coaxially to each other.

7. The bearing device according to claim 6, wherein the first connector has a recess for attachment to a retaining bracket, the recess extending along the axial direction of extension.

8. The bearing device according to claim 2, wherein the second connector has a second positioning portion, and wherein the second positioning portion has a second stop surface configured to secure an axle guide in position.

9. The bearing device according to claim 8, wherein the second stop surface is substantially parallel to the stop surface.

10. The bearing device according to claim 9, wherein the vector between the first and second axial centers is symmetrical to the ratio of the first and second extension lengths.

11. The bearing device according to claim 1, wherein the first connector has a recess for attachment to a retaining bracket, the recess extending along the axial direction of extension.

12. The bearing device according to claim 1, wherein the second connector has a second positioning portion, and wherein the second positioning portion has a second stop surface configured to secure an axle guide in position.

13. The bearing device according to claim 12, wherein the second stop surface is substantially parallel to the stop surface.

14. The bearing device according to claim 1, wherein the vector between the first and second axial centers is symmetrical to the ratio of the first and second extension lengths.

15. An axle suspension, comprising:
an axle guide; and
a retaining bracket, the axle guide fixed to the retaining bracket by the bearing device according to claim 1, the bearing device securing an axial centers of the retaining bracket to an axial center of the axle guide.

16. The axle suspension according to claim 15, further comprising:
an air spring having a center in the axial direction of extension, the axial center of the air spring spaced from the axial center of the retaining bracket.

17. The axle suspension according to claim 16, wherein the bearing device rests on the retaining bracket, and wherein the axle guide is spaced from the retaining bracket.

18. The axle suspension according to claim 15, wherein the bearing device rests on the retaining bracket, and wherein the axle guide is spaced from the retaining bracket.

* * * * *